Sept. 28, 1965  R. H. RAYMOND ETAL  3,208,929
APPARATUS FOR GEL ELECTROPHORESIS
Filed Sept. 11, 1962  2 Sheets-Sheet 1

INVENTORS
SAMUEL RAYMOND
ROBERT H. RAYMOND

BY *Sughrue, Rothwell, Mion, Zinn & Macpeak*

ATTORNEYS.

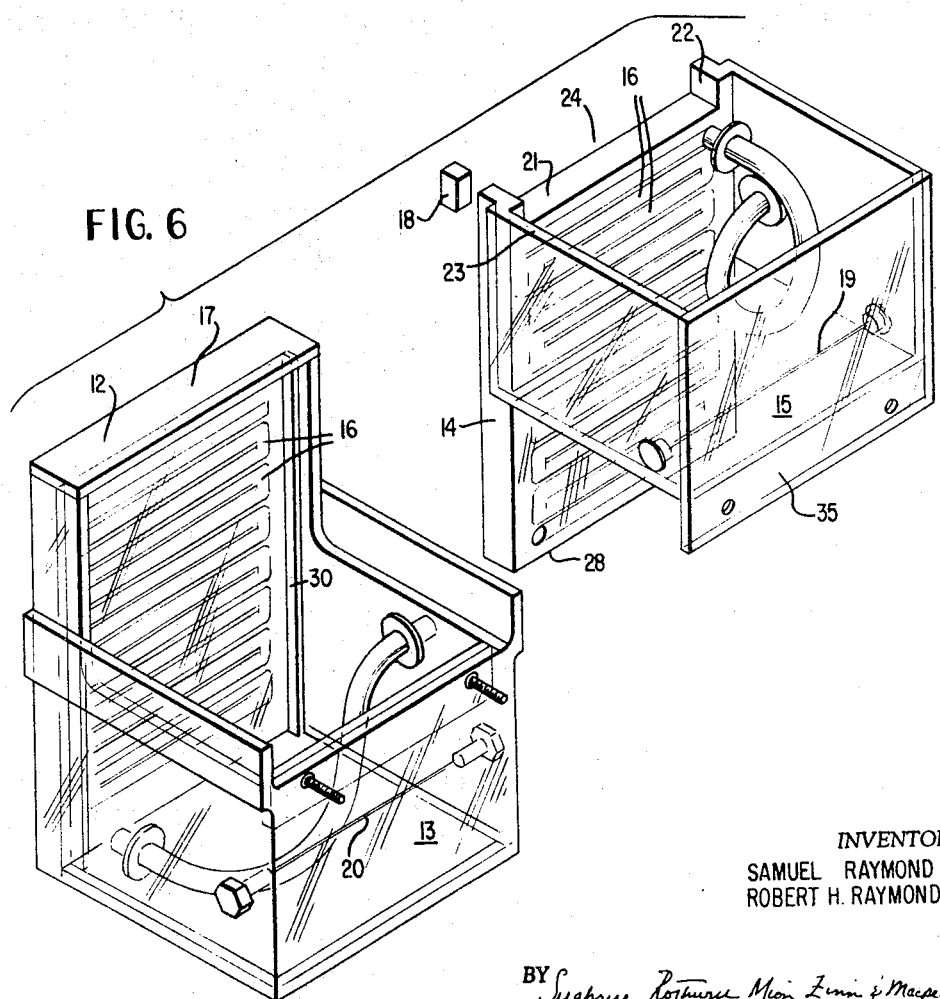

United States Patent Office 3,208,929
Patented Sept. 28, 1965

3,208,929
APPARATUS FOR GEL ELECTROPHORESIS
Robert H. Raymond and Samuel Raymond, both of 538 Walnut Lane, Swarthmore, Pa.
Filed Sept. 11, 1962, Ser. No. 227,971
4 Claims. (Cl. 204—299)

This application is a continuation-in-part of application Serial No. 84,729, filed January 24, 1961, now Patent No. 129,158.

This invention relates particularly to the separation of mixtures by differential migration of the components thereof through a gel medium in an electric field. The procedure is based on differences in migration velocity in an electric field and provides a useful method of effecting separation or purification of mixtures. As example of a useful application of gel electrophoresis may be cited the analysis of serum protein mixtures.

The general method of gel electrophoresis requires (1) providing a gel medium in an appropriate apparatus through which electrophoretic migration may take place; (2) applying a specimen mixture to said gel; (3) maintaining an electric field within said medium until the components of the mixture become separated therein; and (4) distinguishing the separated components of said mixture.

It is an object of this invention to provide an apparatus for effecting gel electrophoresis. As part of this object new and useful means are provided for preparing gel in preferred dimension, shape, and position for conducting electrical current through gel (whereby an electric field is maintained within it), and for applying specimen mixture thereto.

It has been found that separations obtained by gel electrophoresis are significantly improved when an electric field is directed in vertical direction, either upwards or downwards within the gel. It is therefore an object of this invention to provide an apparatus whereby the gel is disposed in a vertical position and a vertical electric field is applied thereto.

It has been found that for some purposes improved separation is obtained when the electric field is distributed uniformly throughout the gel in which the specimen migrates; therefore apparatus is provided by means of which the electric field can be maintained at a uniform intensity throughout the gel. For other purposes it has been found that improved separation is obtained when the electric field varies in intensity throughout the gel; apparatus is therefore provided by means of which a non-uniform electric field of desired geometrical distribution may be maintained within the gel.

It has been found that heat developed within the gel, due to the passage of electric current through it, has a deleterious effect upon the separation obtainable, limiting the intensity of the electric field which may be applied, prolonging the duration of the electrophoresis required to achieve a desired separation, increasing the thermal diffusion broadening of the separated components, and altering the native components of the specimen mixture in an undesirable manner. An object of this invention is therefore to control the heat developed within the gel.

It has been found that a mass flow of background electrolyte (as in some form of vertical electrophoresis) has undesired effects on the separation obtainable. The undesired effects of mass flow are the convective transport of specimen mixture which takes place in mass flow and the diffusion broadening and remixing of separated components. These effects are not produced by electrophoretic or electro-endosmotic transport of the background electrolyte. It is an object of this invention, therefore, to eliminate or minimize mass flow of background electrolyte within the gel.

Electrophoretic or electro-endosmotic transport of the background electrolyte is the result of forces acting through the electric double layer electric between the gel substance and the electrolyte dispersed therein. It has been found that electro-endosmotic transport may either add to or subtract from the electrophoretic transport of the components in the mixture to be separated, depending on the direction of each transport. It is an object of this invention to control electro-endosmotic transport according to the requirements of the process, either increasing or decreasing electro-endosmotic transport as required.

It has been found that the use of wicks and salt bridges to make electrical connection between gel and electrode chambers produces adverse effects upon the results obtained. One of the objects is to provide apparatus which operates without wicks or salt bridges.

Another object of this invention is to reduce the manipulation and the time required to carry out a gel electrophoresis separation.

Evaporation from the gel constitutes a serious problem in gel electrophoresis. This problem has not been overcome heretofore although the following procedures reduce the amount of evaporation: (a) running at low power to reduce the heat generated by the electric currents; (b) carrying out the procedure at a low ambient temperature; (c) coating the gel with a layer of petroleum jelly. One of the objects is to provide control of evaporation.

Previously, methods of gel electrophoresis required the use of a rigid self-supporting gel. One of the objects is to provide apparatus and procedure in which flexible or elastic gels can be used.

Other objects of the invention will be pointed out in the following description and claims and illustrated in the accompanying drawings, which disclosed by way of example, the principle of the invention and the best mode which has been contemplated of applying that principle.

In the drawings:

FIGURE 5A is a diagrammatic view of the separation of a serum protein mixture obtained in the apparatus of FIGURE 1;

FIGURE 5B is a diagrammatic view of the separation of the same in the apparatus of FIGURE 3;

FIGURE 6 is a perspective view of the separated component parts of the apparatus.

Figure 4:
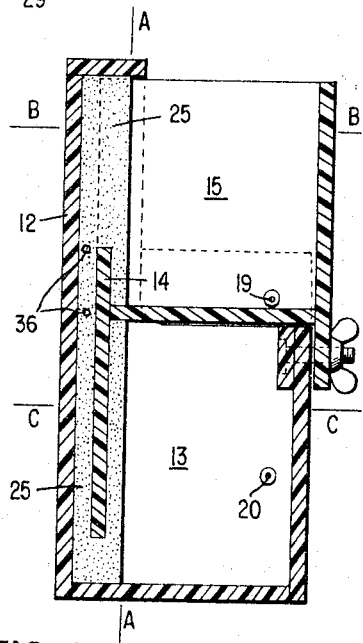
FIGURE 4 is a schematic view of a simplified form of this invention to show one of the principles of operation.

FIGURE 4 is inserted to show one of the features of this invention, the assembly of the components of the apparatus and the gel in situ. Outer part 12 of FIGURE 4 (corresponding to FIGURE 6A) is placed in horizontal position with line AA horizontal. A gel liquid poured into part 12 is retained thereby with the surface of liquid level with line AA. Part 14 (corresponding to FIGURE 6B) is inserted into part 12 so that part 14 is immersed in said gel liquid. When the gel liquid solidifies, the two parts are thereby sealed together. The assembly being turned to the vertical position with lines BB and CC horizontal, liquid buffer may be poured into upper reservoir 15 up to the level BB and is retained thereby and does not drain into lower reservoir 13 through channel 25 as it would otherwise do in the absence of the gel.

Figure 1:
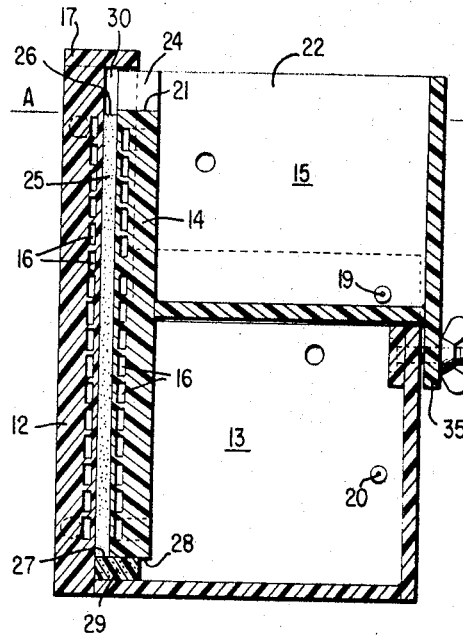
FIGURE 1 is a cross-sectional view of a preferred form of this apparatus in vertical position.
Figure 2:
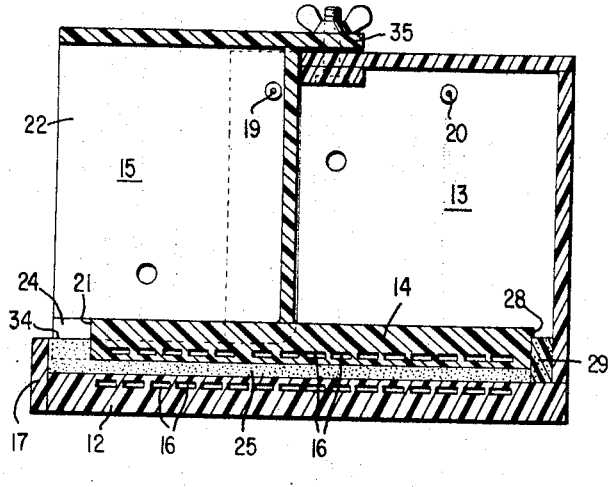
FIGURE 2 is the same in horizontal position.

In accordance with this invention, the apparatus in its preferred form shown in FIGURE 1, comprises outer part 12, shown in FIGURE 6, with associated lower reservoir 13, and inner part 14 shown in FIGURE 6, with associated upper reservoir 15. Parts 12, 14 are maintained at selected temperature by circulation of temperature-controlled fluid through passages 16 associated herewith. Outer part 12 is surrounded on all sides by a wall 17 (which at the lower reservoir end may be continuous with the wall of the lower reservoir) forming a tray in the horizontal position capable of retaining liquid contents. See FIGURE 2. The inner part 14 is smaller than the tray formed by walls 17 and is adapted to be inserted thereinto in a position parallel to part 12 and to be held therein at a fixed distance therefrom. A preferred method of maintaining a fixed distance is by means of stops 18, between the two parts, which may be affixed to either part, or lie free between them. Both upper reservoir 15 and lower reservoir 13 are attached to their respective parts by leak-free attachment so that each reservoir separately is capable of retaining liquid when in the vertical position except that if reservoir 15 be filled to a level above the upper end of part 14 the excess will overflow said upper end.

Within each reservoir is an electrode (19 and 20). Electrode 19 in the upper reservoir is located substantially below the top of the upper reservoir and electrode 20 in the bottom reservoir is located substantially below the top of the bottom reservoir. Each electrode is provided with an electrical connection whereby electric current from an external source may be caused to flow in each electrode.

Upper reservoir 15 extends substantially above the top end 21 of part 14 when in the vertical position. The space so formed between side walls 22, 23, and top end 21 is referred to by reference number 24. It may be seen in the assembled drawing (FIGURE 1) that space 24 is occupied by liquid solution when the upper reservoir is filled to a level above the top end 21, thereby making contact between the liquid in reservoir 15 and gel 25.

The vertical channel, bounded by parts 12 and 14 and side walls 17, provides a channel of liquid communication between upper reservoir 15 and lower reservoir 13. In our invention this channel is first placed in the horizontal position shown in FIGURE 2. This channel is then filled with a gel-forming liquid, which may for example be a liquified agar solution, a hydrolyzed starch solution, a hydrophilic monomer solution or other gel-forming liquid. The gel-forming liquid is caused to gel within the said channel while in the horizontal position. The gel thus formed completely occludes the lumen of said channel and effectively prevents the mass flow of liquid through said channel. Since the channel communicates with each reservoir 13, 15, the upper end 26 of said occluding gel in the vertical position and the lower end 27 thereof are exposed to and covered by liquid contained in said reservoirs respectively, provided that the liquid level in the upper reservoir rises higher than the upper end 14 of the inner part and the liquid level in the lower reservoir rises higher than the lower end 28 of the inner part.

For the purpose of gel electrophoresis the liquid in the reservoirs may be any of the electrically conducting solutions, usually called buffers, known to those skilled in the art of electrophoresis. The electrodes 19 and 20 are immersed in the buffer while maintaining the passage of an electric current therethrough.

It has been found that in the vertical position the apparatus maintains rigid gels in position to occlude the channel but that flexible gels tend to slide down through the channel into the lower reservoir when the apparatus is placed in the vertical position. This invention provides means of preventing displacement of the gel within the channel. Support 29 is inserted into the lower end of the channel before filling the channel with the gel-forming liquid. Support 29 is porous, non-metallic, substantially inert and adapted to permit passage of electric current. A suitable material for the gel support is commercial cellulose sponge. It is essential that the material contain intercommunicating porous passages of liquid communication, whereby the gel support may pass electric current when its passages contain conducting medium.

Gaskets 30 are placed between the parts 12 and 14 at the sides of the channel, whereby a leakproof seal is established between said parts in the vertical position at the sides thereof. These gaskets confine the gel solution to the lumen of the channel and also confine the electric field within said channel during the electrophoresis process. The gaskets may be omitted, in other forms of this invention.

In the preferred form of this invention described in connection with FIGURE 1, parts 12, 14 are positioned parallel to each other so that the lumen of the channel (in the vertical position) has a substantially uniform horizontal cross-sectional area at every level in the channel. Upon passage of an electric current through the uniform channel, an electric field is maintained therein which has substantially the same field strength and direction at every point therein. It has been found that this uniformity is of value in some applications.

The distance between parallel parts 12, 14, is selected for efficient temperature control. Temperature is controlled in this invention by conduction of heat through the surfaces of parts 12, 14 and the gel adjacent thereto. Direct contact between gel and said surfaces is essential for good temperature control. It is preferred to employ a distance of 3 to 6 millimeters between said parts, permitting a current density of ten on up to 100 milliamperes per square centimeter through the gel. A greater distance may be employed, up to 30 millimeters or more, decreasing the permissible current density and thereby increasing the time required for separation, but also permitting the application of a larger sample to the gel.

Figure 3:
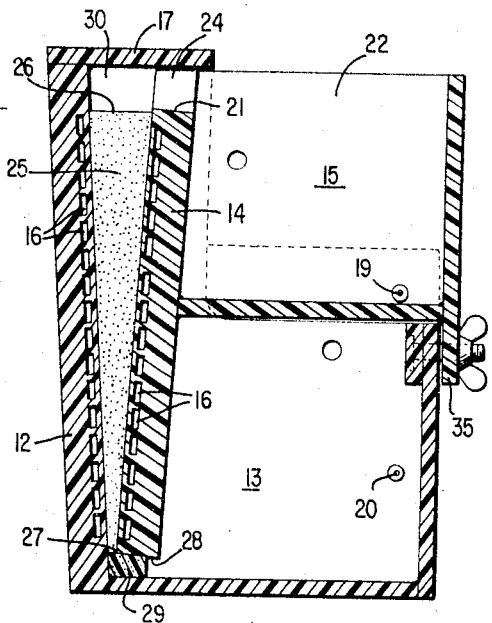
FIGURE 3 is a cross-sectional view of another preferred form of this apparatus.

In a modified form of this invention (FIGURE 3) the parts 12, 14 are positioned at an angle to each other. In the vertical position one part may be vertically positioned and the other may be positioned at an angle away from the vertical; or both parts may be inclined at angles away from the vertical. In the latter case it is preferred to position vertically the imaginary plane bisecting the angle between the two parts. In either case it is preferred to place the wider part of the angle at the top and the narrower part of the angle at the bottom. As shown in FIGURE 3, the lumen of the channel in this second preferred form has a horizontal cross-sectional area which decreases at every successive level taken from top to bottom in the channel but does not decrease to zero. Upon passage of a uniform electric current through the channel, the electric field thereby maintained therein is constant in time but increases in field strength spatially, i.e., from top to bottom in the channel. This results from the crowding together of the electric lines of force as the channel through which they pass becomes smaller. An electric field of this configuration has desirable properties for applications in electrophoresis.

The preferred dimensions for a channel in this form of the invention are 10 to 30 millimeters at the top and 1 to 3 millimeters at the bottom.

The process of gel electrophoresis according to this invention will now be described, employing either preferred form of the apparatus.

The outer and inner part of the apparatus are assembled together in operative assembly and placed in horizontal position. Gel support is placed in position across the bottom of the channel. Gel solution is poured in liquid form into the tray in quantity sufficient to fill completely the lumen of the channel and is then caused to gel in place. During the gelling a slot is cut or molded in the top exposed edge of the gel to receive a sample in liquid form.

After completion of gelling the assembly is repositioned to the vertical position.

Both electrode chambers are filled with buffer liquid to a depth substantially above the level of the electrode in each chamber, and above the upper and lower edges respectively of the inner part, thereby effecting liquid contact with the gel within the channel.

The sample is then added to the previously formed slot in the upper edge of the gel by inserting the tip of a pipet containing the sample to a position below the surface of the buffer but just above the top edge of the gel, and allowing the sample to drain slowly through the buffer into the sample slot. It is necessary that the density of the sample be greater than the density of the buffer. If the density of the sample is too low, a sufficient quantity of urea or other non-ionic compound is dissolved in the sample to raise its density to the necessary degree.

The next step is to circulate temperature-controlling medium through the passages in parts 12, 14, thereby maintaining them at the selected temperature. Then the electrodes are connected to a source of current adjusted to deliver a selected current or voltage.

Observation of the progress of electrophoretic separation is made by any suitable means and when the desired degree of separation is achieved the electric current is stopped and the apparatus is disassembled to recover the gel containing the separated fractions, which are distinguished by known methods such as optical density.

In accordance with known laws of electrophoresis, each individual component in a mixture subjected to electrophoresis moves a distance equal to the product of field strength E, mobility M, and time T. Two or more components in a mixture having different values of mobility M will therefore move to different distances and are thereby separated. The degree of separation is proportional to the difference of mobility values of any two components, as seen in FIGURE 5A.

It has been found however that if the electric field is arranged to increase in strength through the gel in the direction of migration, as in the second preferred form, then the faster-moving components will become accelerated in their movement relatively to the slower-moving ones. The degree of separation of any two components is therefore no longer merely proportional to the difference of their mobilities but is in fact much greater than this, as shown in FIGURE 5B. An electric field of the desired strength is produced in the apparatus by the arrangement of the second preferred form of this invention shown in FIGURE 3. The electric field strength within the gel in this apparatus increases in strength from top to bottom of the gel because of the decreasing horizontal cross-sectional area of the gel in the column.

While there have been shown and described and pointed out fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A vertical gel electrophoresis apparatus comprising:
   (a) a lower buffer solution chamber capable of holding liquid buffer solution and including an upwardly extending end wall for defining a portion of a gel containing passageway,
   (b) an upper buffer solution chamber capable of holding liquid buffer solution, the chamber including an end wall positioned in spaced relationship to the upwardly extending end wall of the lower chamber and defining therewith a gel passageway, the end wall of the upper chamber having means permitting buffer solution to be in fluid communication with the gel passageway so that buffer solution in the buffer chambers may contact gel in said passageway,
   (c) means sealing the gel passageway to prevent the passage of buffer solution along the passageway from the upper chamber to the lower chamber when the passageway is filled with liquid impermeable gel,
   (d) electrode in each buffer chamber positioned below a normal level for buffer solution therein, each electrode including means for connection to a source of D.C. current,
   (e) the upper and lower buffer solution chambers including the gel defining passage walls being constructed of a material having electrically insulating properties at least on the surface thereof, and
   (f) means for holding the upper and lower buffer solution chambers in rigid assembled relationship with the upper chamber above the lower chamber and the end walls thereof cooperating to form the gel passageway.

2. A vertical gel electrophoresis apparatus as defined in claim 1 further comprising means defining passageways in the end walls of the buffer solution containing tanks, and means for circulating a heat transfer fluid therethrough to control the temperature of gel in said passageway.

3. A vertical gel electrophoresis apparatus as defined in claim 1 further comprising an electrically insulating buffer solution porous support positioned at a bottom end of the gel passageways defined by the end walls of the buffer solution containing tanks for preventing gel from sliding out of said passageway.

4. A vertical gel electrophoresis apparatus as defined in claim 1 wherein the end walls of the buffer solution containing chambers when in assembled relationship define a gel containing passageway of wedge shape varying from a thicker top to a thinner bottom end of said passageway.

References Cited by the Examiner

UNITED STATES PATENTS

| | | | |
|---|---|---|---|
| 2,555,487 | 6/51 | Haugaard et al. | 204—299 |
| 2,989,457 | 6/61 | Van Oss | 204—180 |

OTHER REFERENCES

Lederer: Chromatographic Reviews, Volume 2, "Starch Electrophoresis," pages 44–58, 1960.

Smithies: Biochemical Journal, Volume 71, 1959, pages 585–587.

Lederer II: Chromatographic Reviews, Volume 3, "Starch Electrophoresis," pages 17–37, 1961.

Smith: "Chromatographic and Electrophoretic Techniques," Vol. II, 1960, Interscience Publishers, New York, pp. 108–109.

WINSTON A. DOUGLAS, *Primary Examiner.*

JOHN R. SPECK, *Examiner.*